US012576976B2

(12) United States Patent　　　　(10) Patent No.:　　US 12,576,976 B2

Guerchkovitch et al.　　　　　　　(45) Date of Patent:　　　Mar. 17, 2026

(54) ENGINE CHARACTERISTICS MATCHING

(71) Applicant: PRATT & WHITNEY CANADA CORP., Longueuil (CA)

(72) Inventors: Leonid Guerchkovitch, Dollard-des-Ormeaux (CA); Aaron J. Kaufman, Manchester, CT (US); Boris Karpman, Marlborough, CT (US); Manuj Dhingra, Glastonbury, CT (US)

(73) Assignee: PRATT & WHITNEY CANADA CORP., Longueuil (CA)

( * ) Notice: Subject to any disclaimer, the term of this patent is extended or adjusted under 35 U.S.C. 154(b) by 224 days.

(21) Appl. No.: 18/492,261

(22) Filed: Oct. 23, 2023

(65) Prior Publication Data

US 2024/0051674 A1　　　Feb. 15, 2024

Related U.S. Application Data

(62) Division of application No. 16/875,196, filed on May 15, 2020, now Pat. No. 11,827,372.

(51) Int. Cl.
| | |
|---|---|
| *B64D 27/12* | (2006.01) |
| *B64D 27/31* | (2024.01) |
| *B64D 27/33* | (2024.01) |
| *B64D 31/06* | (2024.01) |
| *B64D 31/12* | (2006.01) |
| *B64D 31/18* | (2024.01) |

(Continued)

(52) U.S. Cl.
CPC ............. *B64D 27/12* (2013.01); *B64D 27/31* (2024.01); *B64D 27/33* (2024.01); *B64D 31/06* (2013.01); *B64D 31/12* (2013.01); *B64D 31/18* (2024.01); *B64F 5/60* (2017.01); *B64D 27/026* (2024.01)

(58) Field of Classification Search
CPC ........ B64D 27/12; B64D 27/33; B64D 27/31; B64D 31/18; B64D 31/06; B64D 31/12; B64D 27/026; B64F 5/60
USPC ............................................................. 701/3
See application file for complete search history.

(56) References Cited

U.S. PATENT DOCUMENTS

| | | | | | |
|---|---|---|---|---|---|
| 4,947,096 A | * | 8/1990 | Snow | .................. | G05D 1/0808 |
| | | | | | 244/76 J |
| 5,033,010 A | | 7/1991 | Lawrence | | |

(Continued)

FOREIGN PATENT DOCUMENTS

| | | |
|---|---|---|
| EP | 1129891 A2 | 9/2001 |
| EP | 2482438 A2 | 8/2012 |

(Continued)

OTHER PUBLICATIONS

Turbofan, Wikipedia, May 6, 2020 (Year: 2020).*

(Continued)

*Primary Examiner* — Matthias S Weisfeld

(74) *Attorney, Agent, or Firm* — Norton Rose Fulbright Canada LLP

(57) ABSTRACT

A method of controlling a multi-engine aircraft includes receiving input for commanded thrust and modifying the commanded thrust using a model of an incumbent powerplant to generate a modified commanded thrust for matching aircraft performance with a new powerplant to the aircraft performance with the incumbent powerplant. The method includes applying the modified commanded thrust to the new powerplant.

6 Claims, 3 Drawing Sheets

(51) Int. Cl.
  *B64F 5/60* (2017.01)
  *B64D 27/02* (2006.01)

(56) References Cited

U.S. PATENT DOCUMENTS

| | | | |
|---|---|---|---|
| 5,165,240 A * | 11/1992 | Page | G05D 1/063 |
| | | | 701/100 |
| 6,496,397 B2 | 12/2002 | Sakai et al. | |
| 7,358,698 B2 | 4/2008 | Seguchi et al. | |
| 7,425,806 B2 | 9/2008 | Schnetzka et al. | |
| 8,047,420 B2 | 11/2011 | Stroh | |
| 8,169,179 B2 | 5/2012 | Mohan et al. | |
| 8,196,299 B2 | 6/2012 | Lee et al. | |
| 8,279,620 B2 | 10/2012 | Herron et al. | |
| 8,376,069 B2 | 2/2013 | Nakatsu et al. | |
| 8,587,977 B2 | 11/2013 | Nishikimi et al. | |
| 8,648,559 B2 | 2/2014 | Singh | |
| 8,964,424 B2 | 2/2015 | Sakakibara | |
| 9,077,257 B2 | 7/2015 | Frium | |
| 9,341,145 B2 | 5/2016 | Maier | |
| 9,429,078 B1 | 8/2016 | Crowe | |
| 9,496,802 B2 | 11/2016 | Matsumoto | |
| 9,564,257 B2 | 2/2017 | Karlen et al. | |
| 9,647,556 B2 | 5/2017 | Li et al. | |
| 9,787,217 B2 | 10/2017 | Hu et al. | |
| 9,853,573 B2 | 12/2017 | Siri | |
| 9,889,944 B2 * | 2/2018 | Schmidt | B64C 13/16 |
| 9,923,485 B2 | 3/2018 | Fu et al. | |
| 9,954,335 B2 | 4/2018 | Hasegawa et al. | |
| 10,122,165 B2 | 11/2018 | Zare | |
| 10,141,829 B2 | 11/2018 | Fullmer et al. | |
| 10,145,291 B1 | 12/2018 | Thomassin et al. | |
| 10,374,329 B2 | 8/2019 | Ruess et al. | |
| 10,425,032 B2 | 9/2019 | Tapadia et al. | |
| 10,432,129 B2 | 10/2019 | Mori et al. | |

| | | | |
|---|---|---|---|
| 2008/0275597 A1 * | 11/2008 | Gaulmin | F02C 9/28 |
| | | | 701/100 |
| 2013/0181088 A1 | 7/2013 | Montero et al. | |
| 2013/0341934 A1 | 12/2013 | Kawanishi | |
| 2014/0345281 A1 | 11/2014 | Galbraith | |
| 2018/0230844 A1 * | 8/2018 | Vondrell | H02P 25/30 |
| 2019/0002117 A1 | 1/2019 | Gansler et al. | |
| 2020/0277073 A1 | 9/2020 | Thomassin et al. | |
| 2020/0290742 A1 | 9/2020 | Kumar et al. | |
| 2021/0387741 A1 * | 12/2021 | Tamir | B64D 31/14 |
| 2023/0090083 A1 * | 3/2023 | Maloney | F02D 41/2422 |
| | | | 123/436 |

FOREIGN PATENT DOCUMENTS

| | | | | |
|---|---|---|---|---|
| EP | 2701976 A1 | 3/2014 | | |
| EP | 3163990 A1 | 5/2017 | | |
| EP | 3090951 B1 | 12/2018 | | |
| EP | 3547528 A1 | 10/2019 | | |
| KR | 20130073244 A | 7/2013 | | |
| RU | 2693362 C1 * | 7/2019 | | B64C 39/04 |
| WO | 2016082325 | 6/2016 | | |
| WO | 2017033320 | 3/2017 | | |
| WO | 2017114643 A1 | 7/2017 | | |
| WO | 2018191769 A1 | 10/2018 | | |
| WO | 2018/227270 | 12/2018 | | |

OTHER PUBLICATIONS

Gorospe George E et al: "A novel UAV electric propulsion testbed for diagnostics and prognostics", 2017 IEEE Autotestcon, IEEE, Sep. 9, 2017 (Sep. 9, 2017), pp. 1-6, XP033235547, DOI: 10.1109/AUTEST.2017.8080465 [retrieved on Oct. 23, 2017].

European Patent Office, Extended European Search Report for European Patent Application No. EP21174195.4, dated Oct. 13, 2021.

* cited by examiner

ENGINE CHARACTERISTICS MATCHING

CROSS-REFERENCE TO RELATED APPLICATION

This application is a division of U.S. patent application Ser. No. 16/875,196 filed on May 15, 2020, the entire contents of which are incorporated herein by reference.

1. FIELD

The present disclosure relates to aerospace powerplants, and more particularly to control schemes for powerplants in aerospace applications.

2. BACKGROUND

Engine characteristics for dynamic maneuvers (engine acceleration and deceleration) are a key part of aircraft handling characteristics. For a flight test program, one side of an aircraft may have an experimental engine, while the other side maintains the original engine for safety and reliability reasons. In addition, for aircraft derivative or update programs, it is highly desirable to maintain the same handling characteristics as the original aircraft for safety and training reasons. As such, a method of matching the transient and steady state characteristics of the original engine is required. Pilots can manage multiple engine thrust asymmetry by adjusting aircraft control surfaces. While this may work relatively well in steady state/slow maneuvers and/or when thrust asymmetry is moderate, it can be difficult to make such adjustments work well during fast transients. Automated control systems can be used to compensate for multiple engine thrust asymmetry, however it may be cost prohibitive for an engine development program to employ and/or develop such a control system.

The conventional techniques have been considered satisfactory for their intended purpose. However, there is an ever present need for improved systems and methods for engine characteristics matching. This disclosure provides a solution for this need.

SUMMARY

A method of controlling a multi-engine aircraft includes receiving input for commanded thrust and modifying the commanded thrust using a model of an incumbent powerplant to generate a modified commanded thrust for matching aircraft performance with a new powerplant to the aircraft performance with the incumbent powerplant. The method includes applying the modified commanded thrust to the new powerplant.

The incumbent powerplant can be onboard the aircraft and the method can include applying the commanded thrust to an incumbent powerplant. It is also contemplated that the incumbent powerplant can be a previous model powerplant that is no longer onboard the aircraft, or never was onboard the aircraft, wherein the aircraft includes two or more of the new powerplants, and applying the modified commanded thrust can include applying the modified commanded thrust to all new powerplants onboard the aircraft.

Applying the modified commanded thrust can include using an open control loop where shaped thrust is converted to effector position to apply the modified thrust to the new powerplant.

The model and modified command thrust can be configured to emulate the incumbent powerplant with the new powerplant. The incumbent powerplant can be a heat engine and the new powerplant can be a hybrid electric powerplant. The model can include a non-linear equation and/or an N-dimensional table.

A system includes an aircraft having a new aircraft powerplant. A controller is connected to control thrust of the new aircraft powerplant. The controller includes torque split logic configured to receive input of commanded thrust and to output command thrust to the new aircraft powerplant. A thrust command modification unit is connected to receive command thrust input and to output a modified thrust command to the torque split logic for control of the new powerplant, wherein the thrust command modification unit is configured to: receive input for commanded thrust; modify the commanded thrust using a model of an incumbent powerplant to generate a modified commanded thrust for matching aircraft performance with the new powerplant to the aircraft performance with the incumbent powerplant; and apply the modified commanded thrust to the new powerplant.

The new powerplant can be a hybrid electric powerplant including a heat engine and an electric motor. The torque split logic can be configured to command the heat engine and electric motor together to produce a commanded split torque.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
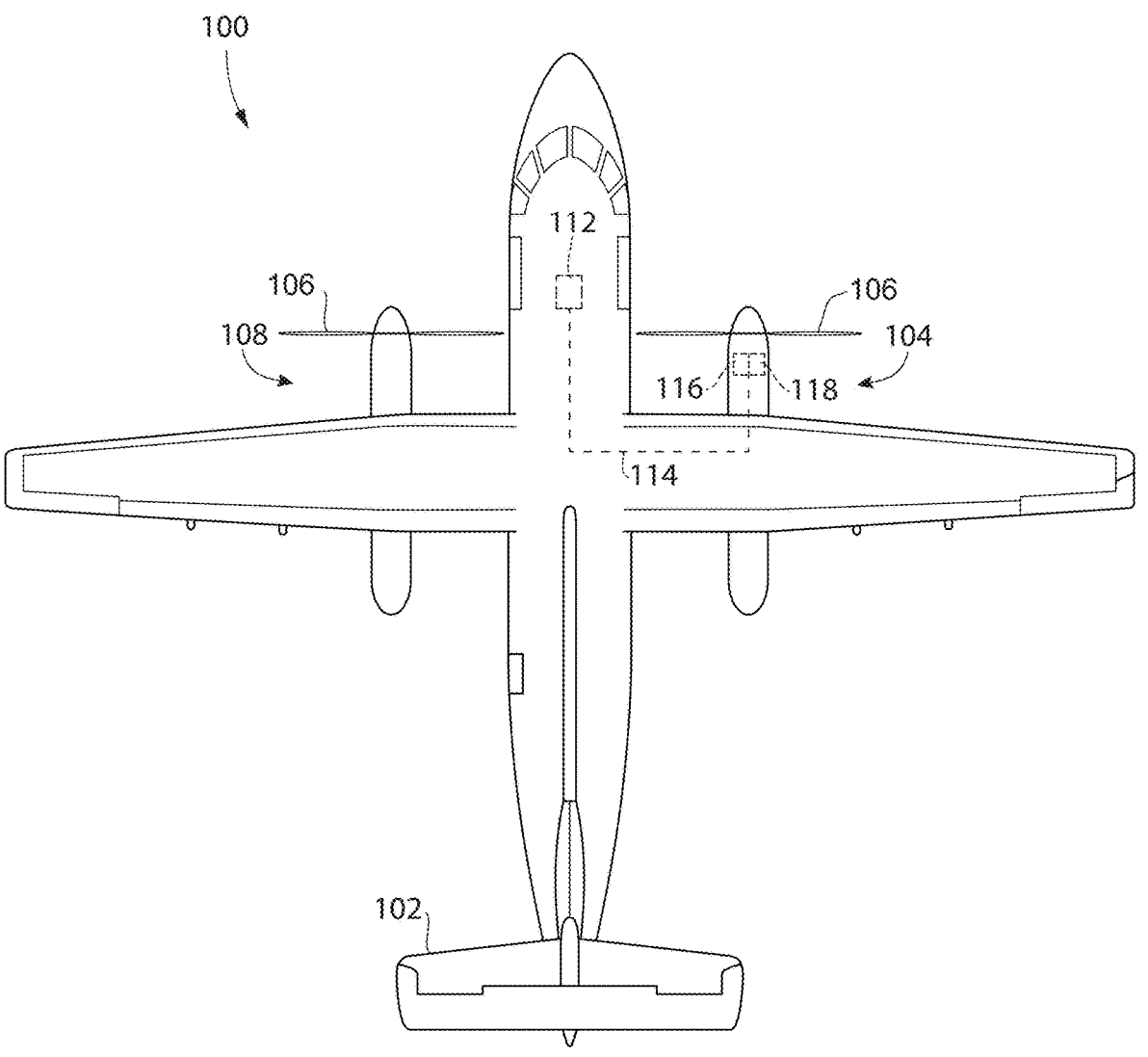
FIG. 1 is a schematic plan view of an embodiment of a system constructed in accordance with the present disclosure, showing the incumbent powerplant and the new powerplant.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS.

2-5, as will be described. The systems and methods described herein can be used to provide thrust matching, e.g., for test bed aircraft with both incumbent engines and new engines.

The system 100 includes an aircraft 102 having a new aircraft powerplant 104 for powering the propeller 106. An incumbent engine 108 is included opposite the new powerplant 104, with its own respective propeller 106. A controller 112 is connected via line 114 to control thrust of the new aircraft powerplant 104, e.g. by controlling torque delivered to the propeller 106. The new powerplant 104 is a hybrid electric powerplant including a heat engine 116 and an electric motor 118 connected in parallel with one another to drive the propeller 106. The incumbent powerplant 108 can be a gas turbine engine, e.g., a turboprop engine.

The controller 112 is configured to receive input, e.g., from a pilot or autonomous system, on desired torque or thrust, and to command modified, split torque to the heat engine 116 and electric motor 118 to ultimately match the trust performance of the incumbent powerplant 108. The incumbent powerplant 108 is shown and described here being onboard the aircraft 102, and the methods herein include applying the commanded thrust to the incumbent powerplant 108, e.g. without modifying as done for the new powerplant 104. It is also contemplated that the incumbent powerplant 108 can be a previous model powerplant that is no longer onboard the aircraft 102, or never was onboard the aircraft 102. For example, the aircraft 102 can include two or more of the new powerplants 104, and applying the modified commanded thrust can include applying the modified commanded thrust to all new powerplants 104 onboard the aircraft 102 so the aircraft 102 performs as it would with only incumbent powerplant(s) 108.

The controller 112 includes torque split logic 120 configured to receive input 122 of commanded thrust (Mrq in FIG. 2 indicates torque demanded) and to output command thrust. The command thrust is split between two components Mrq_EM (torque demanded from the electric motor 118) and MrqTM (torque demanded for the heat engine 116). A combining gear box (CGB) 128 combines the torque from the electric motor (EM) 118 and heat engine (Therm Eng) 116 and outputs the combined toque to a reduction gear box (RGB) 130 to turn the propeller 106 of the new powerplant 104.

The controller 112 includes a feedback loop 124 configured to control the electric motor 118 with feedback Mrq_em (torque feedback from the electric motor), which is summed/differenced with Mrq_EM from the torque split logic 120. This sum/difference is passed through the major loop control 132, which outputs iEMrq (current commanded by the electronic powertrain controller or EPC) to the minor loop control 134, which outputs iEM (actual current going to the EPC) to the electric motor 118.

The controller 112 also includes a feedback loop 126 configured to control the heat engine 116 with feedback Mrq_TM (torque demanded from the heat engine 116), which is summed/differenced with Mcal_th (calculated actual thrust of the heat engine 116, calculated from summing/differencing Mfb, torque feedback from the RGB 130 and Mfb_em, torque feedback from the electric motor 118). Mcal_th is also used as an input for the torque split logic 120. This sum/difference is passed to the major control loop 136, which outputs WfRq (fuel flow required to the heat engine 116) to the minor control loop 138, which outputs Wf (actual fuel flow going to the heat engine 116) to the heat engine 116.

The thrust command modification unit 140 is connected to receive command thrust input 142 (and optionally sensing or feedback) and to output a modified thrust command Mrq to the torque split logic 120 for control of the new powerplant 104. Thrust command modification unit 140 is configured to receive input 142 for commanded thrust; modify the commanded thrust using a model of an incumbent powerplant 108 (shown in FIG. 1) to generate a modified commanded thrust (Mrq_em and MrqTM) for matching aircraft performance with the new powerplant 104 to the aircraft performance with the incumbent powerplant 108; and apply the modified commanded thrust to the new powerplant 104.

Figures 2, 3:
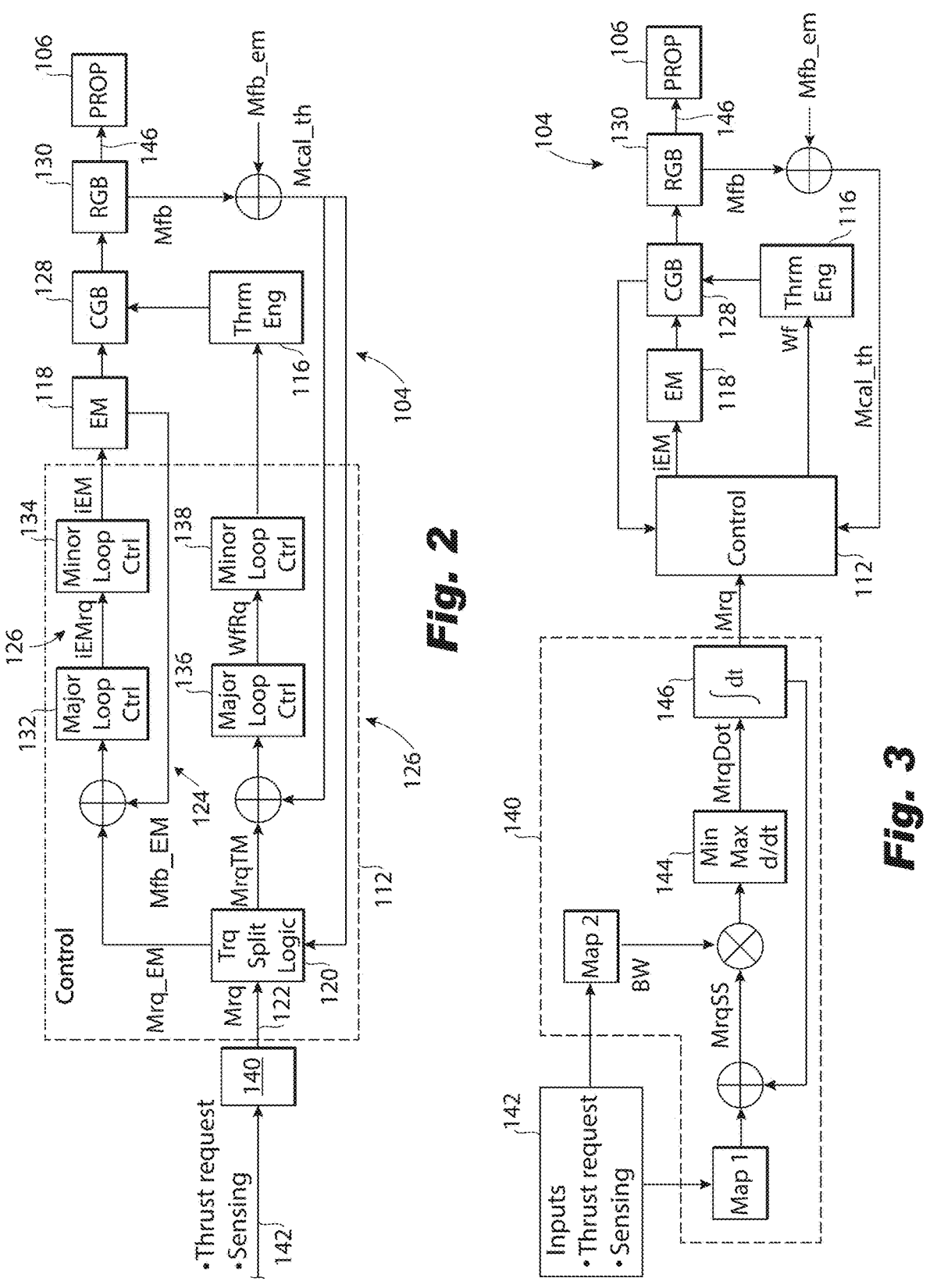
FIG. 2 is a schematic view of a portion of the system of FIG. 1, showing the connection between the input(s), the controller, and the new powerplant.
FIG. 3 is a schematic view of a portion of the system of FIG. 1, showing the controller and the thrust command modification unit using an open control loop.
Figures 4, 5:
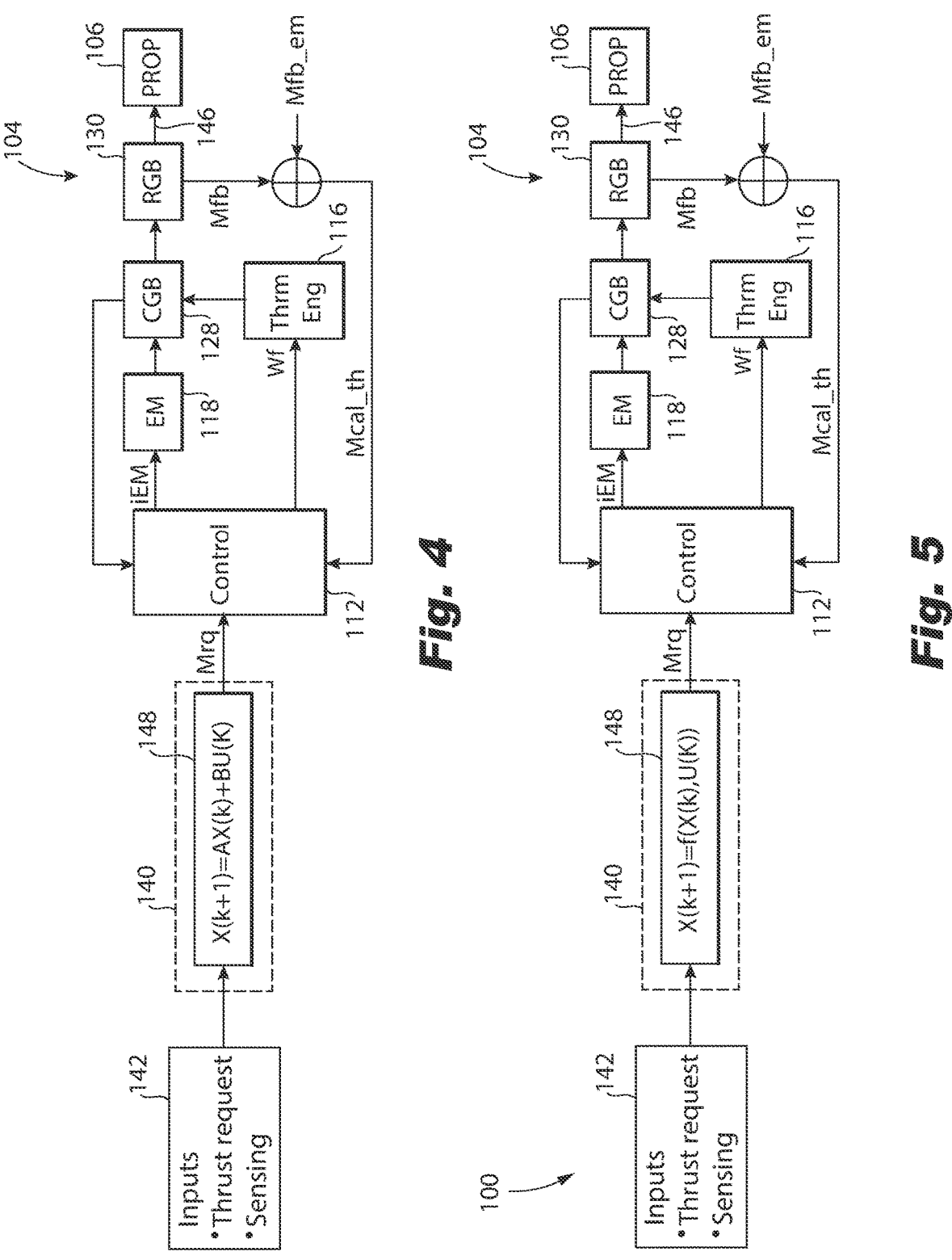
FIG. 4 is a schematic view of a portion of the system of FIG. 1, showing the controller and a thrust command modification unit.
FIG. 5 is a schematic view of a portion of the system of FIG. 1, showing the controller and a thrust command modification unit.

With reference now to FIGS. 3-5, options for thrust control modification unit are explained. These include but are not limited to a first order non-linear coefficient dynamic response model (described below with reference to FIG. 3), a first order linear coefficient dynamic response model (described below with reference to FIG. 4), and a first order non-linear dynamic response model (described below with reference to FIG. 5).

With reference now to FIG. 3, applying the modified commanded thrust Mrq can include using a first order non-linear coefficient dynamic response model in the thrust command modification unit 140, wherein shaped or mapped thrust is converted to effector position to apply the modified thrust to the new powerplant 104. In FIG. 3, Map 1 is a map of steady state torque of the incumbent powerplant 108 (shown in FIG. 1) mapped to steady state torque of the new powerplant 104. Map 2 is a map of torque bandwidth of the incumbent powerplant 108 (shown in FIG. 1) mapped to torque performance of the new powerplant 104.

The input 142 is applied to both Map 1 and Map 2. The output of Map 1 is summed with the torque request Mrq (integral of MrqDot), producing the steady-state torque request MrqSS, which is multiplied by the bandwidth (BW), the output of Map 2. This product is range limited in a maximum/minimum rate change component 144, generating the MrqDot signal, which is integrated in box 146 to output the torque request Mrq.

With reference now to FIG. 4, that the unit 140 can be configured to use a first order linear coefficient dynamic response model such as a system of 1st order difference equations with piece-wise linear coefficients. The model in box 148 can be non-linear such as a first order non-linear dynamic response model shown in FIG. 4 or can instead be an N-dimensional table.

The methods and systems of the present disclosure, as described above and shown in the drawings, provide for thrust matching, e.g., for test bed aircraft with both incumbent engines and new engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of controlling a multi-engine aircraft comprising:

receiving input for commanded thrust;

modifying the commanded thrust using a model of an incumbent powerplant to generate a modified commanded thrust for matching aircraft performance with a new powerplant to the aircraft performance with the incumbent powerplant; and applying the modified commanded thrust to the new powerplant, wherein the incumbent powerplant is a previous model powerplant that is no longer onboard the aircraft, or never was onboard the aircraft, wherein the aircraft includes two or more of the new powerplants, and wherein applying the modified commanded thrust includes applying the modified commanded thrust to all new powerplants onboard the aircraft.

2. The method as recited in claim 1, wherein applying the modified commanded thrust includes using an open control loop where shaped thrust is converted to effector position to apply the modified thrust to the new powerplant.

3. The method as recited in claim 1, wherein the model and modified command thrust are configured to emulate the incumbent powerplant with the new powerplant.

4. The method as recited in claim 1, wherein the incumbent powerplant is a heat engine and wherein the new powerplant is a hybrid electric powerplant.

5. The method as recited in claim 1, wherein the model includes a non-linear equation.

6. The method as recited in claim 1, wherein the model includes an N-dimensional table.

* * * * *